United States Patent [19]

Coulon et al.

[11] Patent Number: 4,824,695
[45] Date of Patent: Apr. 25, 1989

[54] PROCESS AND APPARATUS FOR COATING A SUBSTRATE

[75] Inventors: Jean C. Coulon, Mercurey, France; Carl Kramer; Wolfgang Schaefer, both of Aix La Chapelle; Hans Sustmann, Colonge, all of Fed. Rep. of Germany

[73] Assignee: Saint-Gobain Vitrage, Courbevoie, France

[21] Appl. No.: 816,220

[22] Filed: Jan. 6, 1986

[30] Foreign Application Priority Data

Jan. 7, 1985 [FR] France .................................. 85 00134

[51] Int. Cl.⁴ ............................................. B05D 1/12
[52] U.S. Cl. .................................... 427/168; 427/180; 118/308; 118/310; 118/312; 65/60.1; 65/60.51
[58] Field of Search ............................ 65/60.51, 60.1; 118/308, 312, 310; 427/180, 168

[56] References Cited

U.S. PATENT DOCUMENTS

| 4,019,887 | 4/1977 | Kirkbride et al. | 65/60 |
| 4,349,372 | 9/1982 | Laethem et al. | 427/168 X |
| 4,397,259 | 8/1983 | Kanda et al. | 118/323 |
| 4,397,671 | 8/1983 | Vong | 427/168 X |
| 4,469,045 | 9/1984 | Chesworth | 118/718 |

FOREIGN PATENT DOCUMENTS 2058350 11/1970 Fed. Rep. of Germany .

OTHER PUBLICATIONS

Chesworth, Sn. 094,988, 11/16/79, Declaration Under Rule 1.132.

Primary Examiner—Shrive Beck
Attorney, Agent, or Firm—Pennie & Edmonds

[57] ABSTRACT

The invention relates to the process and apparatus coating of a substrate, particularly a glass ribbon, with a pulverulent product. The invention proposes the implementation of a distribution nozzle (10, 24) that sprays the pulverulent product in suspension in a gas, and a suction device (14) for evacuating the resultant waste of the decomposition of the pulverulent product from a coating zone (Z). The invention concerns the formation of at least one to extend the residence time of the pulverulent product in the coating zone to facilitate its deposit on the substrate. The invention also concerns the production of substrates, particularly glazings, coated with metal oxides.

37 Claims, 3 Drawing Sheets

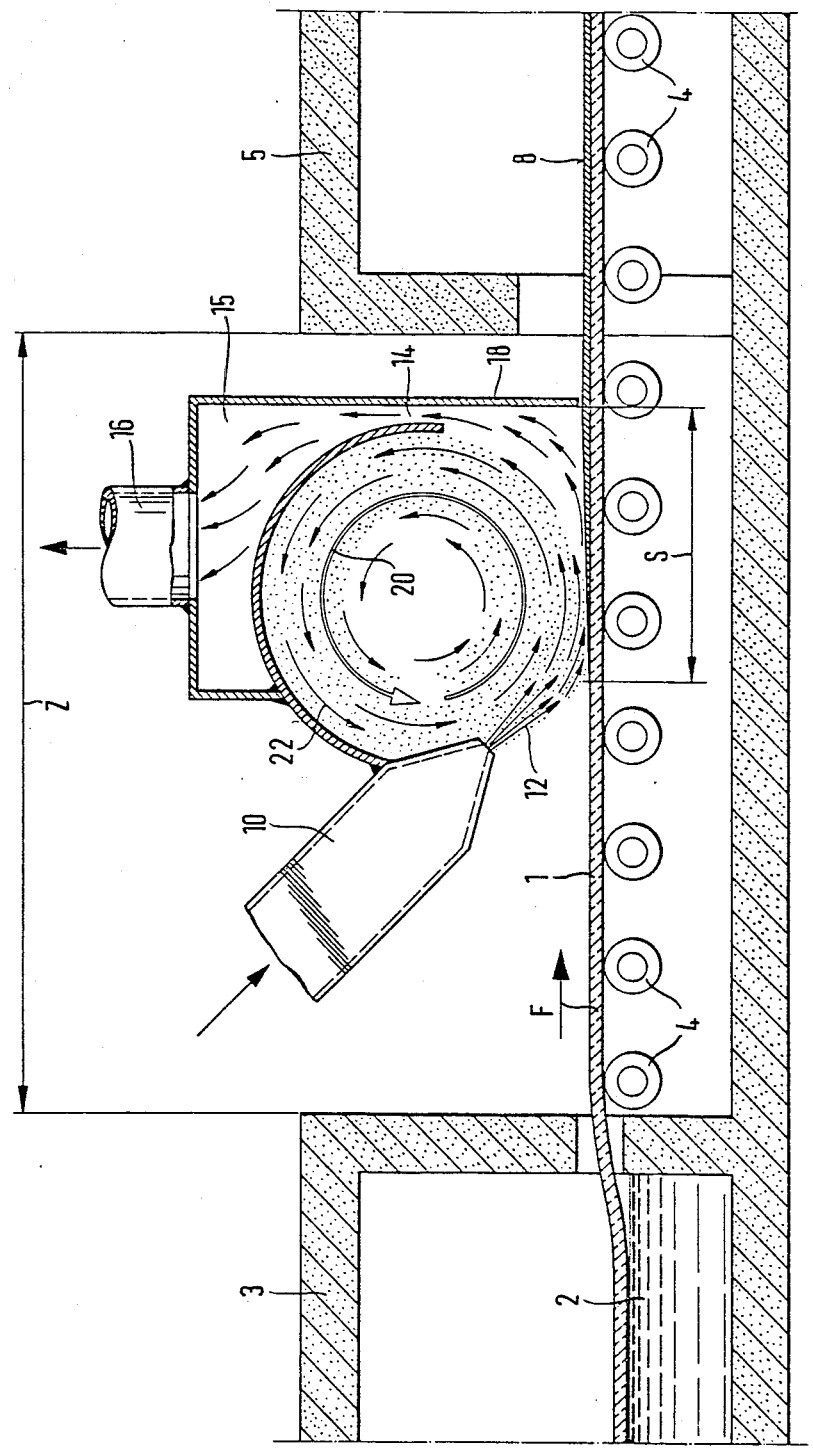

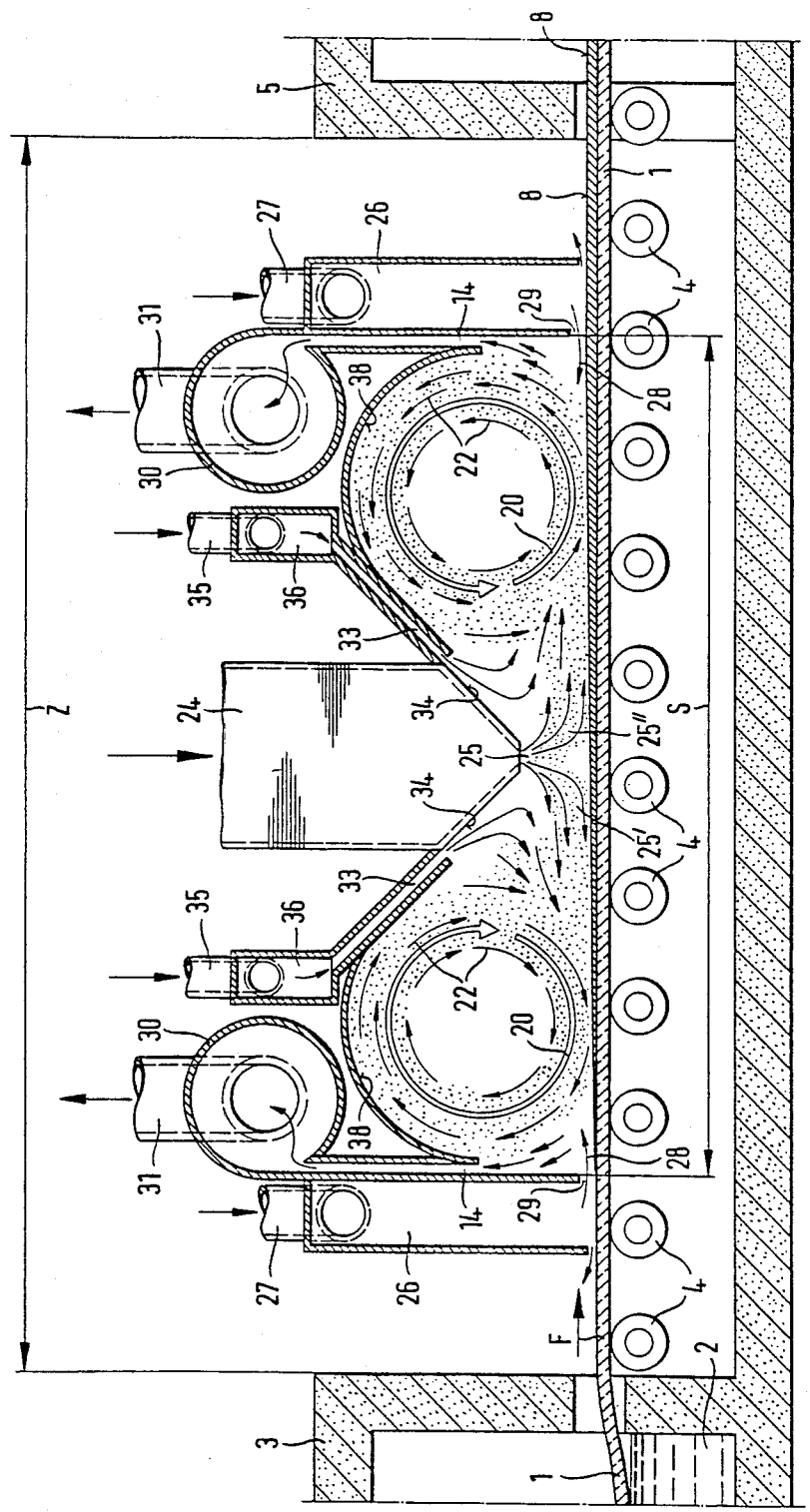

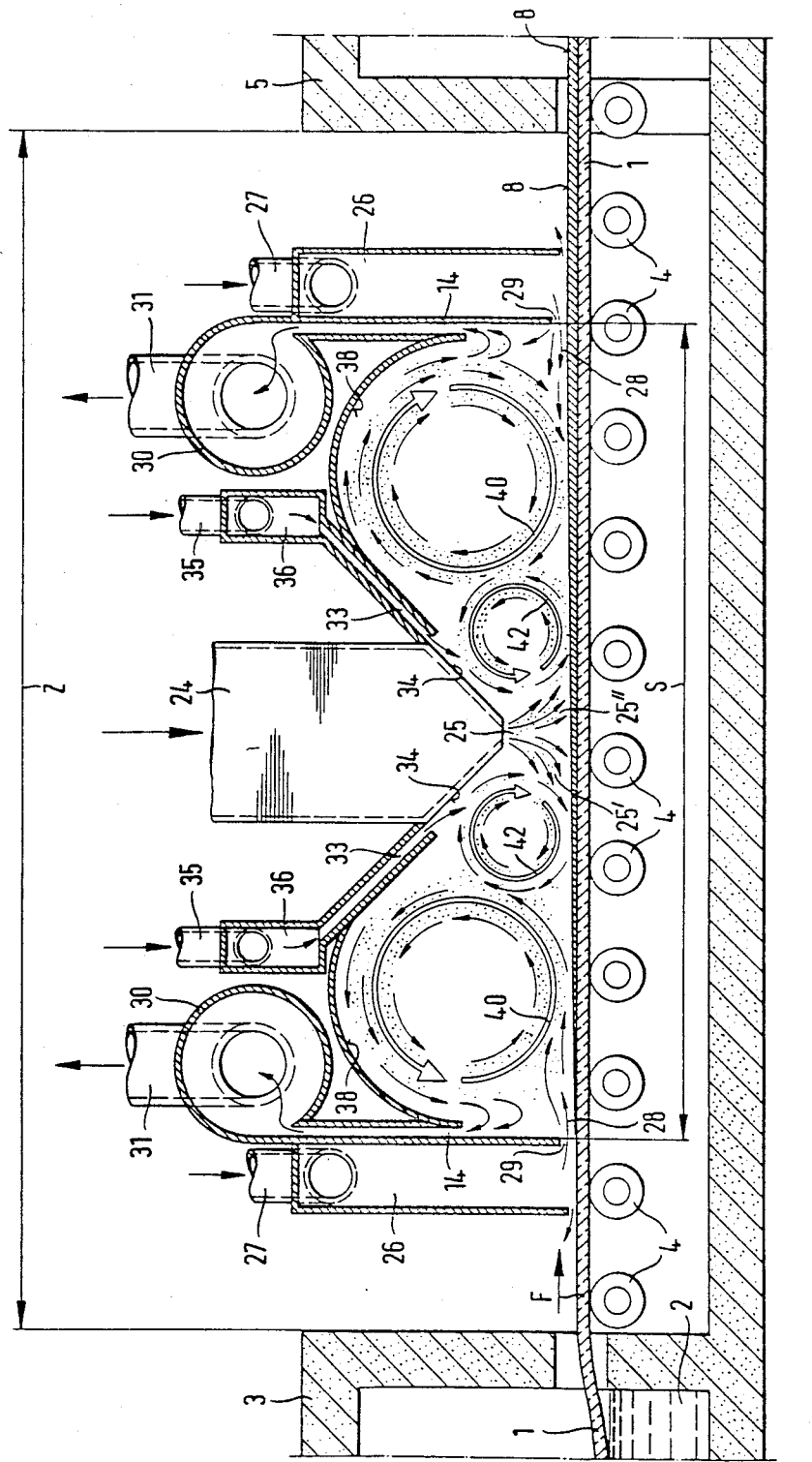

PROCESS AND APPARATUS FOR COATING A SUBSTRATE

DESCRIPTION

1. Technical Field

The invention is in a process, and apparatus, for coating a glass which may be a glass ribbon with a pulverulent product. The pulverulent product comprising the coating is entrained in and mixed with a gas current (carrier) to be directed over the glass at an angle of incidence. The coating operation is carried out by a nozzle having a slotted end. The carrier and pulverulent product sweep the surface of the glass before the surface is suctioned by a slotted device located at a distance from and parallel to the nozzle.

2. Background of the Invention

According to the prior art, processes have been developed to provide a glass ribbon with a coating. The coating may be in the form of a layer of metal oxide to impart to the glass ribbon precise qualities of reflection or transmission. These processes may be carried out directly along the production line of the glass ribbon, shortly after its production, while the glass ribbon is at an elevated temperature. Halogenated compounds in a powder state, such as those described in German published application DE No. 3,010,077 and its U.S. Equivalent, U.S. Pat. No. 4,707,383, for example, are used to obtain a layer of tin oxide doped with fluorine reflecting infrared.

It has been found that only a minor portion of the powder suspended in the gas current remains attached to the surface of the glass ribbon. As such, only a minor portion of the powder is destroyed by pyrolysis to form the desired oxide film under the effect of the high temperature of the glass ribbon. The major portion of the powder remains entrained in and is carried away by the gas current to be suctioned by a slotted device, for example.

SUMMARY OF THE INVENTION

The invention improves upon the prior art by markedly increasing the efficiency of the deposition process. To this end, the process of the invention and the apparatus for carrying out the process functions in a manner whereby an amount of powder greater than the minor portion of powder heretofore being capable of deposit is deposited on the surface of the glass which may be a glass ribbon. Thus, the process and the apparatus for carrying out the process provides for the production of desired layers with reduced amounts of powder. The improved operation is attained by creating and maintaining at least one eddy of gas charged with powders in the space in a coating deposition chamber between the nozzle and suction device.

Each eddy provides a rotary circulation, and within the heart of the eddy particles of powder entrained in the gas current rotate approximately like a solid body. The particles of powder rather than being removed rapidly from the zone of deposition by the suction device along a straight line path of movement are drawn into a path of circular movement so that the average time of residence of the particles of powder in the zone of deposition within the depositing chamber is lengthened. Generally, the eddy causes the particles of powder to sweep the surface of the glass several times to increase the probability of greater amounts of powder depositing on the surface. The greatly increased efficiency of the process leads to a very significant savings in pulverulent product.

The size of the eddy, referring to the diameter of the eddy, and its speed of rotation may be adjusted by a modification of the volume of gas sprayed by the nozzle and/or volume of gas to be suctioned by the suction device. These modifications have a direct effect on the residence time of the particles of powder in the depositing chamber so that the particles of powder sweep the surface of the glass for as along a period as possible.

The invention envisions the formation and maintenance of a second eddy in the space between the nozzle and suction device which rotates in a direction opposite of the direction of rotation of the first eddy. The eddies are formed by a gas current directed parallel to the surface of the glass against the suspension, that is, the gas charged with powders sprayed by the nozzle, and onto the surface of the glass outside the suction current. The formation and maintenance of additional eddies further improves the desired effect.

Other developments and advantages of the process according to the invention, and the apparatus for carrying out the process, will be detailed as the description to be read in conjunction with reference to the accompanying drawing continues.

BRIEF DESCRIPTION OF THE DRAWING

FIG. 1 illustrates an installation for coating a glass in the form of a float glass strip with a pulverulent product according to an embodiment of the invention;

FIG. 2 illustrates the coating installation including a depositing device, a nozzle and a zone of eddies; and FIG. 3 illustrates an installation similar to that of FIG. 2 and structure providing conditions of the process wherein two eddies rotating in opposite directions are formed on each side of a nozzle.

BEST MODE FOR CARRYING OUT THE INVENTION

The invention in the process and the apparatus for carrying out the process has a particular application of use for coating float glass directly after the production of the continuous glass strip. Similarly, the invention may be used to coat cast glass under circumstances that the glass ribbon is produced by a rolling device and, thereafter, moved directly to a cooling furnace. The drawing Figures illustrate the float glass process.

Referring to the drawing, a glass ribbon 1 (hereafter "glass") is illustrated supported on a metal bath 2 of molten tin within a chamber 3. The glass is formed under reduced atmosphere conditions within the chamber, and raised above the level of the metal bath in the chamber to exit the chamber along rollers of a roller conveyor. Movement of the glass, in the direction of arrow F may be imparted by rollers 4 which direct the glass to and through a cooling furnace 5. The glass may be at a temperature of about 600° C. at the exit of chamber 3 and is cooled in the cooling furnace to about ambient temperature.

A coating zone Z is located between chamber 3 and cooling furnace 5. It is within the zone Z that the glass 1 is coated with pulverulent product forming by pryolitic transformation of a partially reflective metal oxide layer 8. Heating devices (not shown) may be located within zone Z above and/or below the glass to adjust the temperature conditions.

The pulverulent product, for example, may comprise a very finely divided powder of dibutyltin difluoride under circumstances of producing a layer of tin oxide doped with fluorine. A nozzle 10 having a slotted end of a length to extend throughout the width of glass 1 may be used in the uniform distribution of the pulverulent product. A nozzle of this type is described in European application 125,153 and its U.S. Equivalents U.S. Pat. Nos. 4,562,095 and 4,533,571.

The nozzle 10 is located slightly above the glass 1, and the pulverulent coating material is blown onto the glass in the form of a suspension of particles of powder in a gas current. In FIG. 1, the nozzle is located at an angle of less than 90° relative to the surface of the glass moving through zone Z. The suspension is identified by the numeral 12. The gas current and entrained powder is directed over the glass ribbon along a length S before penetrating through suction opening 14. The suction opening is located in closed box 15 and suctioned by pipe 16. Suction opening 14 includes a slotted end like the slotted end of nozzle 10. As such, the slotted end of the suction opening also extends throughout the width of glass 1. The slotted end of the suction opening is also located slightly above the glass and formed partially by a wall 18 that extends toward the path of movement of the glass and substantially into contact with its surface. The wall, thus, delimits the coating zone Z at the downstream end and prevents the gas current charged with powder from leaving the zone except through the suction opening. The other side of the suction opening is formed by a wall which is arcuate in outline from the opening to the nozzle 10 near the nozzle opening.

The geometric ratios between the size of the chamber formed by nozzle 10, suction opening 14, closed box 15, and wall 18, and the suspension 12 of powder in a gas current as sprayed by nozzle 10 and suctioned through the suction opening 14 are determined and controlled to form a stable gas eddy in the chamber of coating zone Z. The eddy and particularly the rotating current surrounding the eddy prevents the suspension of powder in the gas current sprayed by nozzle 10 from being suctioned directly from the chamber by the slotted end of the suction opening 14 after only one sweep of glass ribbon 1. Rather, it is a consequence of eddy 20 to envelope or entrain a more or less large portion of the suspension so that the suspension sweeps the glass surface several times before being suctioned from the chamber.

Referring to FIG. 2, the chamber of coating zone Z is illustrated between the chamber 3 of the flotation furnace and cooling furnace 5. A distribution nozzle 24 is arranged so that a current 25 of gas and entrained powder is directed vertically toward glass 1. The current 25 will divide into two substantially equal subcurrents 25' and 25" each of which circulate in opposite directions. Particularly, the subpart 25" circulates in a counterclockwise direction and subpart 25' circulates in the opposite direction.

The coating chamber is closed by a pair of spaced vertical walls located upstream and downstream the distribution nozzle 24. The vertical walls each define a subchamber 26 which otherwise is open. Hot gas under a pressure higher than ambient pressure conditions is introduced by pipes 27 to each subchamber. The walls like the wall 18 extend toward the glass to provide a slot 29 below the suction opening 14. The hot gas is evacuated from the subchambers 26 to enter into the coating chamber S as a partial current 28.

Suction openings 14 are located parallel to chambers 26 and each suction opening communicates with a suction chamber. The suction chambers are formed by a helical pipe 30 and the gas is suctioned through pipe 31.

Nozzle 24, more particularly, the nozzle body, supports a number of blowing nozzles 33 each located to provide an outlet opening along the lower walls 34 of nozzle 24. The nozzles 33 provide a source of an auxiliary hot gas current which is communicated from pipes 35 and dividing boxes 36 into the coating chamber. The gas current is directed from each nozzle 33 along a length of nozzle 24 and assures that distribution nozzle 24 is heated. The gas current also assures the heating of the gaseous mixture in the coating chamber.

Two walls 38, each extending from the suction opening of a suction nozzle to the outlet opening of nozzle 33, limit the height of the coating chamber. The walls each have a cylindrical shape to prevent the formation of dead zones for the circulation of the gases.

The arrangement on each side of the distribution nozzle 24 provides or forms a stable eddy 20 from the gas-powder mixture. The eddies 20, as previously discussed, rotate in opposite directions. The currents, illustrated as gas currents 22, with fluid flows outside the eddies supply the eddies with powder so that each eddy undergoes a rotary circulation and approaches the glass surface several times before being evacuated. Accordingly, the likelihood of powder being deposited on the glass surface is considerably increased.

The device of FIG. 3 for implementing the process corresponds in most essential characteristics to the device of FIG. 2. According to FIG. 3, however, it will be possible to obtain two additional eddies including eddies 40, 42 on each side of distribution nozzle 24. Each pair of eddies, both upstream and downstream in the direction of movement of glass 1, rotate in opposite directions. The eddies may be formed by increasing the volume of current through pipes 27 which circulates in chambers 26, by simultaneously increasing the suctioned gas volume, and, if necessary, by modifying the gas current charged with powder sprayed by the distribution nozzle. It should be noted, also, that the gas volume suctioned through pipes 30 and 31 plays a role in the formation of the double eddies.

All gas volumes are determined and controlled so that the eddies of rotating gas currents 40, 42 are stable to attain a lengthening of the residence time the gas powder mixture in the coating chamber.

We claim:

1. A process for coating a glass ribbon with a metal oxide coating obtained by pyrolysis of a pulverulent powder product of an organic compound in which, by a distribution nozzle ending in a slot, a gas current charged with said pulverulent product is directed over the glass ribbon at such an angle that it sweeps the surface of the glass before being suctioned by a slotted device, placed at a distance from the nozzle and parallel to it, characterized in that at least one eddy current of gas charged with said pulverulent product is created and maintained in the space between the nozzle and the suctioning device by a ceiling member located therebetween.

2. Process according to claim 1, wherein the size and speed of rotation of said at least one eddy are adjusted by controlling the gas volume sprayed by the nozzle and/or the suctioned gas volume.

3. Process according to one of claims 1 or 2, wherein, by increasing the suctioned gas volume, two additional eddies having reverse directions of rotation are created and maintained.

4. Process according to claim 1, wherein at least one eddy is created and maintained on each side of the nozzle.

5. A process for coating a glass substrate with a metal oxide coating obtained by pyrolysis of a pulverulent powder material which comprises:
   entraining a predetermined amount of pulverulent powder material of an organic compound in a stream of carrier gas;
   spraying said gas-entrained pulverulent material at a predetermined angle toward said substrate so as to produce a uniform coating of said oxide upon the surface of said substrate;
   forming at least one stable eddy current having a rotary circulation from a major portion of said spray of pulverulent material, so as to increase the likelihood of depositing said oxide upon the surface of said substrate, thus increasing the efficiency of said process by reducing the amount of pulverulent material required; and
   evacuating a remaining minor portion of said gas-entrained pulverulent material that did not pyrolytically decompose on the surface of said substrate.

6. The method of claim 5 which further comprises heating said glass substrate to a temperature of about 600° C. prior to depositing said pulverulent material thereupon.

7. The process of claim 5 wherein said gas-entrained pulverulent material is sprayed at an angle of less then 90° relative to the surface of said glass substrate.

8. The process of claim 5 wherein said gas-entrained pulverulent material is sprayed at an angle of substantially 90° onto the surface of said glass substrate.

9. The process of claim 5 wherein at least two stable eddy currents are formed and wherein said eddy currents circulate in opposite directions.

10. The process of claim 5 wherein, by increasing the volume of gas evacuated, a pair of stable eddy currents are formed on either side of said spray of said gas-entrained pulverulent material and wherein each member of each said pairs of eddy currents rotates in an opposite direction to that of a corresponding member of said pair.

11. The process of claim 5 wherein the size and speed of rotation of each eddy current are adjusted by controlling the volume of gas sprayed and/or the volume of gas suctioned.

12. A process for coating a glass substrate with a metal oxide coating obtained by pyrolysis of a pulverulent powder material which comprises:
   entraining a predetermined amount of pulverulent powder material in a stream of carrier gas;
   spraying said gas-entrained pulverulent material at a predetermined angle toward said substrate so as to produce a uniform coating of said oxide upon the surface of said substrate;
   forming at least one stable eddy current having a rotary circulation from a major portion of said spray of pulverulent material, so as to increase the likelihood of depositing said oxide upon the surface of said substrate, thus increasing the efficiency of said process by reducing the amount of pulverulent material required;
   heating said glass substrate to a temperature of about 600° C. prior to contacting said pulverulent material therewith;
   pyrolyzing said pulverulent material upon contacting said heated substrate so as to form a metal oxide layer deposited thereupon; and
   evacuating a remaining portion of said gas entrained pulverulent material that did not pyrolytically decompose upon the surface of said substrate.

13. An apparatus for coating a glass substrate with a metal oxide coating obtained by pyrolysis of a pulverulent powder material which comprises:
   nozzle means positioned above and at a predetermined angle to said glass substrate in a coating zone of said apparatus, for directing a gas entrained pulverulent powder material onto the surface of said substrate;
   means for forming at least one stable eddy current of at least a major portion of said pulverulent powder material, said eddy current having a rotary circulation so as to increase the likelihood of pyrolytically depositing said powder material upon the surface of said substrate and thus increasing the uniformity of said coating, said nozzle means representing a portion of said eddy current forming means at a first end thereof; and
   suction vent means located within said coating zone for creating a strong exhaust effect to remove the remaining minor portion of said pulverulent powder material that does not deposit upon the surface of said substrate thus preventing both the contamination of said finished coating and the spread of toxic waste materials into the surrounding atmosphere, said suction means representing a portion of said eddy current forming means at an end opposite said first end thereof, wherein said forming means includes an arcuate surface positioned above the end portions formed by said nozzle and suction vent means.

14. The apparatus of claim 13 wherein said pulverulent powder material is a halogenated powder compound capable of depositing a coating of a metal oxide upon the surface of said substrate by the pyrolytic decomposition of said compound.

15. The apparatus of claim 13 wherein said spray means is a nozzle.

16. The apparatus of claim 13 which further comprises a coating zone in which a coating of said pulverulent powder material is deposited upon the surface of said substrate.

17. The apparatus of claim 16 which further comprises at least one chamber means located within said coating zone, at least an upper portion of said chamber means being defined by a ceiling member installed above said substrate and between said spray means and said suction vent means.

18. The apparatus of claim 17 which further comprises two of said chamber means located one on either side of said spray means.

19. The apparatus of claim 17 wherein one vertical side portion of each of said chamber means defines a vertical wall portion of said suction vent means.

20. The apparatus of claim 11 wherein said ceiling member is generally arcuate in shape.

21. The apparatus of claim 13 wherein said nozzle is positioned at an angle of less than 90° relative to the surface of said substrate.

22. The apparatus of claim 13 wherein said nozzle is positioned substantially vertically to the surface of said substrate.

23. An apparatus for coating a glass substrate with a metal oxide coating obtained by pyrolysis of a pulverulent powder material which comprises:
- a coating zone in which said glass substrate is supported;
- a distribution nozzle extending into said coating zone at a predetermined angle for spraying said pulverulent powder material entrained in a carrier gas into said coating zone;
- a suction vent device communicating with said coating zone for creating a strong exhaust effect to remove substantially all of any remaining pulverulent powder material therefrom that did not pyrolytically decompose upon the surface of said substrate, thus preventing both the contamination of said finished coating and the spread of toxic waste materials into the surrounding atmosphere; and
- a ceiling member which along with said nozzle forms an upper limit of said coating zone, said member located between said distribution nozzle and said suction vent device for forming at least one rotating eddy flow of said gas entrained pulverulent powder material wherein the average residence time of said material within said coating zone is increased due to a resultant increase in the number of times the powder material in said eddy current sweeps the surface of said substrate;
- wherein said ceiling member includes an arcuate surface and is located at a position higher than said suction vent device and said nozzle.

24. The apparatus of claim 23 wherein said ceiling member is generally arcuate in shape.

25. The apparatus of claim 23 wherein said powder material is directed by said nozzle in a flow toward said substrate at an angle of substantially 90° for creating at least one eddy current on each side of said flow of pulverulent material.

26. The apparatus of claim 25 which further comprises a second suction vent device in communication with said coating zone, each of said suction devices located on opposite sides of said nozzle, and a second ceiling member forming an upper limit of said coating zone between said nozzle and said second suction device for forming a second eddy current of said powder material/gas mixture.

27. The apparatus of claim 25 which further includes a blowing nozzle for blowing an auxiliary current of hot air into said coating zone, said blowing nozzle being directed so that said hot air moves toward said powder material/gas mixture for heating the same.

28. The apparatus of claim 26 wherein said ceiling member is generally arcuate in shape.

29. An apparatus for coating a glass ribbon with a metal oxide coating obtained from pyrolysis of a pulverulent powder material which comprises:
- a distribution nozzle directed vertically to the surface of said glass ribbon, said nozzle located within a coating zone of said apparatus;
- a deposition chamber adjacent at least one side of said nozzle, said chamber defined by at least one vertical member and said nozzle, and further defining a boundary of said coating zone; and
- suction vent means located opposite said nozzle for creating a strong exhaust effect within said deposition chamber, to remove as a waste product substantially all of said powder which did not pyrolytically decompose upon said ribbon, thus preventing both the contamination of said finished coating and the spread of toxic waste materials into the surrounding atmosphere, said vent means located parallel to said chamber inside said coating zone; wherein said coating zone is limited in height by a ceiling member having an arcuate surface positioned above and extending between said nozzle and said suction vent means.

30. The apparatus of claim 29 wherein said ceiling member is generally arcuate in shape.

31. An apparatus according to claim 29 wherein said ceiling member forms a portion of the opening of the suction device.

32. An apparatus for coating a glass ribbon with a pulverulent powder material which comprises:
- a distribution nozzle directed vertically to the surface of said glass ribbon, said nozzle located within a coating zone of said apparatus;
- a deposition chamber located upon at least one side of said nozzle, said chamber defined by at least one vertical member and further defining an outer boundary of said coating zone;
- at least one blowing nozzle for projecting an auxiliary stream of hot gas along an outer surface of said distribution nozzle; and
- suction vent means for creating a strong exhaust effect within said at least one deposition chamber, to remove as a waste product substantially all of said powder which is not coated upon said ribbon, thus preventing both the contamination of said finished coating and the spread of toxic waste materials into the surrounding atmosphere, said vent means located parallel to said at least one chamber and inside said coating zone, wherein said coating zone is limited in height by a ceiling member placed between the nozzle and the suction vent.

33. An apparatus according to claim 32 wherein a terminal portion of said ceiling member is positioned proximal to the opening of the blowing nozzle.

34. A process for coating a glass ribbon with a pulverulent powder product in which, by a distribution nozzle ending in a slot, a gas current charged with pulverulent product is directed over the glass ribbon at such an angle that it sweeps the surface of the glass before being suctioned by a slotted device, placed at a distance from the nozzle and parallel to it, characterized in that two first eddy currents of gas charged with said pulverulent product are created and maintained on each side of the nozzle in the space between the nozzle and the suctioning device by a ceiling member located therebetween, and further wherein two second eddy currents are created on each side of the nozzle wherein the rotation of the second eddy currents are the reverse direction than the first eddy currents.

35. A process for coating a glass ribbon with a pulverulent powder product, said process comprising:
- directing a spray of gas charged with said pulverulent powder product at a predetermined angle through a distribution nozzle into a coating zone and therein over said glass ribbon to sweep the surface of said glass ribbon;
- creating at least one eddy current of gas charged with said pulverulent powder product in said coating zone by a ceiling member located between said nozzle and a suction device located adjacent thereto to increase the likelihood of depositing said powder material upon the surface of said glass ribbon;

blowing an auxiliary current of hot gas into the coating zone, said hot gas being directed generally toward said spray of gas-entrained pulverulent powder material for the heating thereof; and exhausting from said coating zone substantially all of said gas-entrained pulverulent powder material which shall not have become deposited upon said glass ribbon, thus preventing both the contamination of said finished coating and the spread of toxic waste materials into the atmosphere.

36. The method of claim 1, 5, 12, 35 or 34 wherein the powder is a halogenated compound which produces a metal oxide coating upon the substrate.

37. An apparatus according to any one of claims 29, 31, 32 or 33 wherein said vertical members that define the sides of the coating zone are formed by open subchambers through which a hot gas current is injected.

* * * * *